United States Patent
Arndt et al.

(10) Patent No.: US 6,643,727 B1
(45) Date of Patent: Nov. 4, 2003

(54) ISOLATION OF I/O BUS ERRORS TO A SINGLE PARTITION IN AN LPAR ENVIRONMENT

(75) Inventors: Richard Louis Arndt, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 09/589,664

(22) Filed: Jun. 8, 2000

(51) Int. Cl.[7] .............................. G06F 13/36; H04L 1/00
(52) U.S. Cl. .............................. 710/314; 710/15; 714/8; 714/43; 714/44
(58) Field of Search .................... 710/36, 200; 707/102; 714/5, 57, 47

(56) References Cited

U.S. PATENT DOCUMENTS

| | | | | |
|---|---|---|---|---|
| 4,843,541 A | * | 6/1989 | Bean et al. ..................... | 710/36 |
| 5,659,756 A | * | 8/1997 | Hefferon et al. ............ | 710/200 |
| 6,223,299 B1 | * | 4/2001 | Bossen et al. ................. | 714/5 |
| 6,256,753 B1 | * | 7/2001 | Williams ...................... | 714/47 |
| 6,304,984 B1 | * | 10/2001 | Neal et al. ..................... | 714/57 |
| 6,408,304 B1 | * | 6/2002 | Kumhyr ...................... | 707/102 |

FOREIGN PATENT DOCUMENTS

JP                11003294 A  *  1/1999 ........... G06F/13/00

* cited by examiner

*Primary Examiner*—Mark H. Rinehart
*Assistant Examiner*—Christopher E. Lee
(74) *Attorney, Agent, or Firm*—Duke W. Yee; Mark E. McBurney; Lisa L. Yociss

(57) ABSTRACT

A method, system, and apparatus for isolating an input/output (I/O) bus error, received from an I/O adapter, from the other I/O adapters that may be in different partitions within a logically partitioned data process system is provided. In one embodiment, the logically partitioned data processing system includes a system bus, a processing unit, a memory unit, a host bridge, a plurality of terminal bridges, and a plurality of input/output adapters. The processing unit, memory unit, and the host bridge are all coupled to each other through the system bus. Each of the plurality of terminal bridges is coupled to the host bridge through a first bus. Each of the input/output adapters is coupled to one of the plurality of terminal bridges through a one of a plurality of second buses, such that each input/output adapter corresponds to a single terminal bridge. Each of the input/output adapters are assigned to one of a plurality of logical partitions within the data processing system. Each of the terminal bridges isolates errors received from a respective one of the input/output adapters from other input/output adapters, some of which may be within a different one of the plurality of logical partitions.

10 Claims, 3 Drawing Sheets

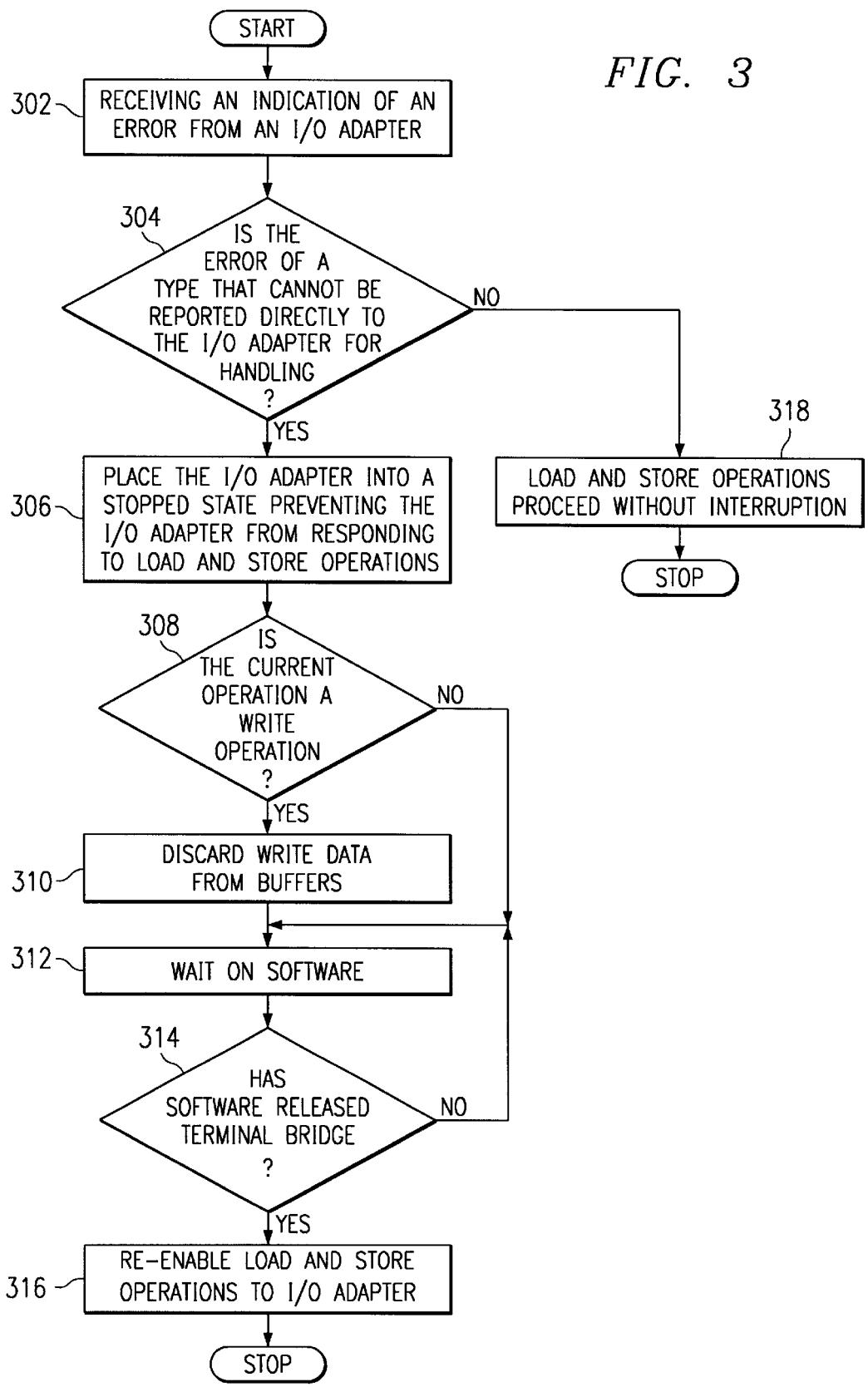

ated I/O bus errors to a single partition in an LPAR environment

CROSS REFERENCE TO RELATED APPLICATIONS

The present application is related to co-pending U.S. patent application Ser. No. 09/589,665 entitled "DMA WINDOWING" filed even date herewith. The content of the above mentioned commonly assigned, co-pending U.S. Patent application is hereby incorporated herein by reference for all purposes.

BACKGROUND OF THE INVENTION

1. Technical Field

The present invention relates generally to the field of computer architecture and, more specifically, to methods and systems handling input and output bus errors.

2. Description of Related Art

By definition, a logically partitioned (LPARed) system is one in which multiple operating systems (OSs) or multiple instances (multiple copies of the OS loaded into memory) of the same OS can be running on the system simultaneously. It is a requirement that all errors, both hardware and software, be isolated to the partition or partitions that are affected by the particular error.

For input/output (I/O) subsystems, this requirement can be tricky, since I/O bus architectures are not designed to isolate their errors between I/O adapters (IOAs) such that one IOA does not "see" errors occurring on a different IOA. Thus an error occurring in a single IOA may cause an error that cannot be isolated, with existing architectures, to one single partition. For example, for peripheral component interconnect (PCI) buses, if one IOA activates the System Error (SERR) signal on the bus, which is a generic System Error signal that is used to signal an event to the system that cannot be handled by the device or the device driver, it is indistinguishable as to which IOA activated the signal since it is a shared signal. In such situations where the error is not isolated, the hardware has to ensure that all partitions see the same error. However, this requirement is contrary to the definition and intent of logical partitioning.

To make matters worse, in a tree-structured system such as a PCI bus, errors can propagate up the tree. Also, the store and forward nature of the write operations can cause a non-recoverable error that needs to be isolated to a particular partition.

One solution that addresses the PCI problem is to assign all IOAs under one PCI Host Bridge (PHB) to one single LPAR partition. However, this results in a granularity that is not very usable by the user. Ideally, the user should be able to assign the IOAs in each individual slot to a different partition, regardless of which PHB the IOA falls under. Therefore, a method and system that allows for isolation of errors generated by one IOA preventing them from affecting a partition other than the partition to which that IOA is assigned, is desirable.

SUMMARY OF THE INVENTION

The present invention provides a method, system, and apparatus for isolating an input/output (I/O) bus error, received from an I/O adapter, from the other I/O adapters that may be in different partitions within a logically partitioned data processing system. In one embodiment, the logically partitioned data processing system includes a system bus, a processing unit, a memory unit, a host bridge, a plurality of terminal bridges, and a plurality of input/output adapters. The processing unit, memory unit, and the host bridge are all coupled to each other through the system bus. Each of the plurality of terminal bridges is coupled to the host bridge through a first bus. Each of the input/output adapters is coupled to one of the plurality of terminal bridges through a one of a plurality of second buses, such that each input/output adapter corresponds to a single terminal bridge. Each of the input/output adapters are assigned to one of a plurality of logical partitions within the data processing system. Each of the terminal bridges isolates errors received from a respective one of the input/output adapters from other input/output adapters, some of which may be within a different one of the plurality of logical partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a flowchart illustrating an exemplary method of isolating I/O bus errors to a single partition within a logically partitioned environment in accordance with the present invention.

DETAILED DESCRIPTION OF THE PREFERRED EMBODIMENT

Figure 1:
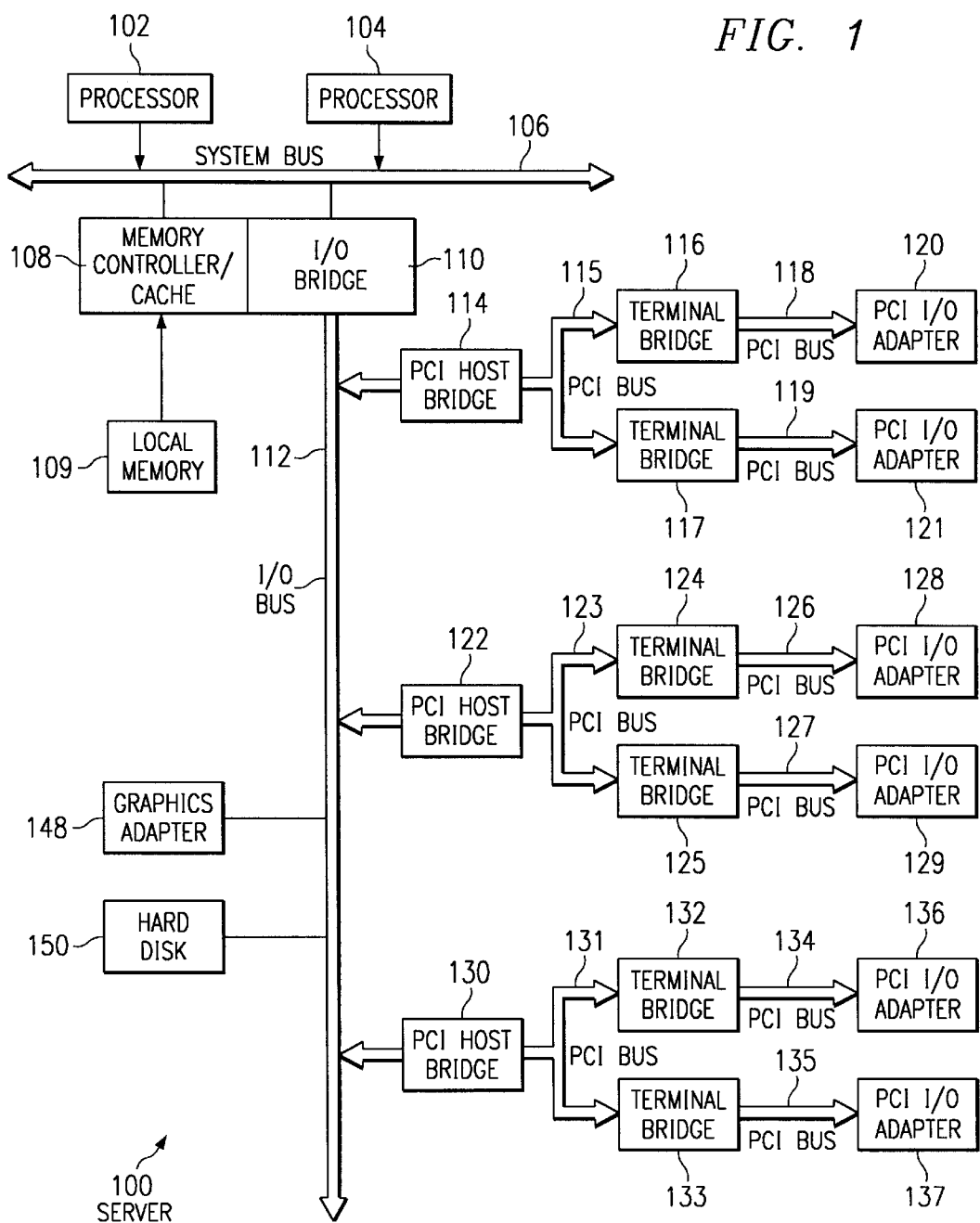
FIG. 1 depicts a block diagram of a data processing system, which may be implemented as a logically partitioned server, in accordance with the present invention.

With reference now to the figures, and in particular with reference to FIG. 1, a block diagram of a data processing system, which may be implemented as a logically partitioned server, is depicted in accordance with the present invention. Data processing system 100 may be a symmetric multiprocessor (SMP) system including a plurality of processors 102 and 104 connected to system bus 106. For example, data processing system 100 may be an IBM RS/6000, a product of International Business Machines Corporation in Armonk, N.Y. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple operating systems (or multiple instances of an operating system) running simultaneously. Each of theses multiple operating systems may have any number of software programs executing within in it. Data processing system 100 is logically partitioned such that different I/O adapters 120–121, 128–129, and 136–137, are assigned to different logical partitions.

In this example, data processing system 100 is divided into three logical partitions, P1, P2, and P3. Each of I/O adapters 120–121, 128–129, and 136–137 is assigned to a different partition. For example, I/O adapters 120, 128, and 129 may be assigned to logical partition P1; I/O adapters 121 and 137 may be assigned to partition P2; and I/O adapter 136 may be assigned to logical partition P3. Of course, depending on the implementation, different numbers of I/O adapters and partitions may be used.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance of the AIX operating system may be executing within partition P2, and a Windows 2000™ operating system may be operating within logical partition P3. Windows 2000 is a product and trademark of Microsoft Corporation of Redmond, Wash.

Peripheral component interconnect (PCI) Host bridge 114 connected to I/O bus 112 provides an interface to PCI local bus 115. A number of Terminal Bridges 116–117 may be connected to PCI bus 115. Typical PCI bus implementations will support up to ten Terminal Bridges for providing expansion slots or add-in connectors. Each of Terminal Bridges 116–117 is connected to a single PCI I/O Adapter 120–121 through a PCI Bus 118–119. Each I/O Adapter 120–121 provides an interface between data processing system 100 and input/output devices such as, for example, other network computers, which are clients to server 100. In this exemplary embodiment, only a single I/O adapter 120–121 may be connected to each terminal bridge 116–117.

Each of terminal bridges 116–117 is configured to prevent the propagation of errors up into the PCI Host Bridge 114 and into higher levels of data processing system 100. By doing so, an error received by any of terminal bridges 116–117 is isolated from the shared buses 115 and 112 of the other I/O adapters 121, 128–129, and 136–137 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 122 and 130 provide interfaces for additional PCI buses 123 and 131. Each of additional PCI buses 123 and 131 are connected to a plurality of terminal bridges 124–125 and 132–133 which are each connected to a PCI I/O adapter 128–129 and 136–137 by a PCI bus 126–127 and 134–135. Thus, additional I/O devices, such as, for example, modems or network adapters may be supported through each of PCI I/O adapters 128–129 and 136–137. In this manner, server 100 allows connections to multiple network computers. A memory mapped graphics adapter 148 and hard disk 150 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
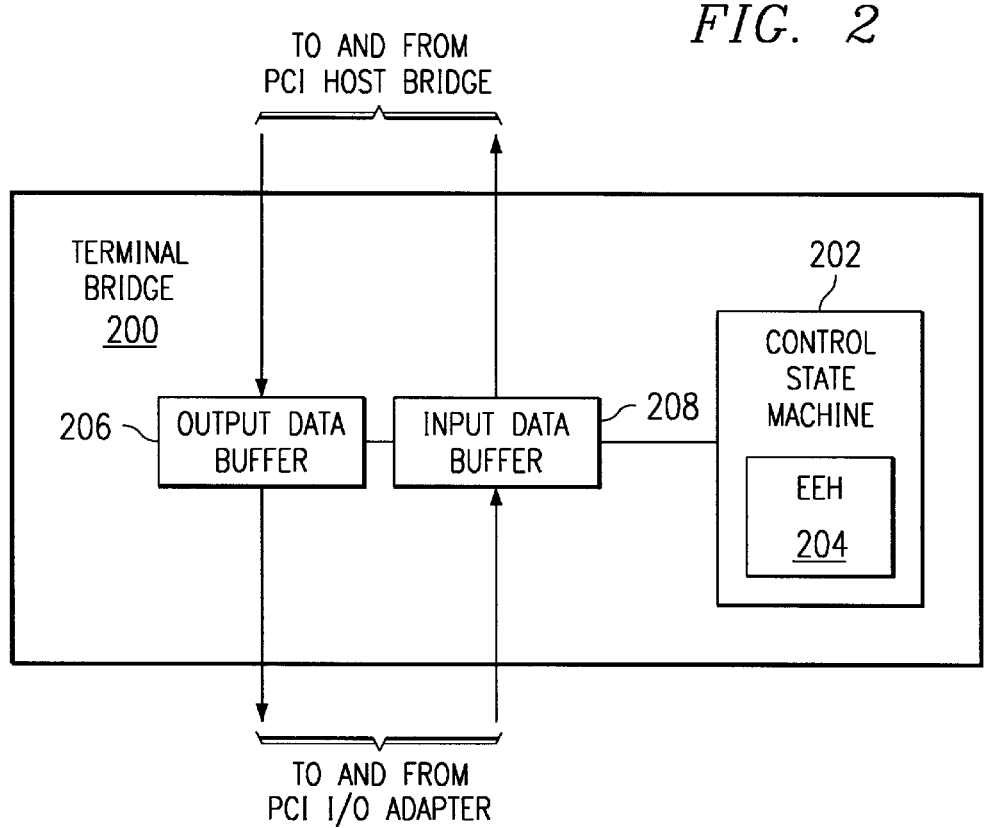
FIG. 2 depicts a block diagram of a terminal bridge in accordance with the present invention.

With reference now to FIG. 2, a block diagram of a terminal bridge, which may be implemented as one of terminal bridges 116–117, 124–125, and 132–133 in FIG. 1, is depicted in accordance with the present invention. Terminal bridge 200 includes an output data buffer 206, an input data buffer 208, and a control state machine 202. Control state machine 202 includes an enhanced error handling (EEH) unit 204.

Output data buffer 206 is a small memory bank that receives data from a PCI Host Bridge, such as, for example, PCI host bridge 114 in FIG. 1, and stores the data for processing by control state machine 202 prior to passing it on to a PCI I/O adapter, such as for example, PCI I/O adapter 120. Input data buffer 208 is also a small memory bank that receives data from the PCI I/O adapter and stores the data for processing by control state machine 202 prior to passing it on to the PCI host bridge. The control state machine directs the flow of operations between the PCI Host Bridge PCI bus and the PCI I/O Adapter PCI bus. This control is generally described by the PCI-to-PCI Bridge Architecture Specification, as defined by the PCI Special Interest Group.

The EEH 204 within control state machine 202 is added by the present invention and prevents errors from the I/O adapter from being propagated up into the shared buses of the other IOAs, such that these errors are isolated from other logical partitions.

In order for errors to be isolated from the shared buses of other I/O adapters that may be in different partitions from the I/O adapter on which the error occurred, the following conditions should be met. When the I/O adapter (IOA) attached to the terminal bridge encounters an error on its PCI bus, it is placed into the enhanced error handling (EEH) stopped state. The EEH stopped state is the state where no further operations are allowed to cross the bridge either to or from the IOA (i.e., Load and Store operations to the IOA are blocked and DMA operations from the IOA are blocked). In the EEH stopped state, the control state machine 202 prevents these operations.

When entering the EEH stopped state, any data in the buffers 206–208 for that IOA is discarded. From the time that the IOA EEH stopped state is entered, the IOA is prevented from responding to Load and Store operations from the processors 102, 104. A Load operation returns all 1's in the data to the processor software which is executing the Load operation, with no error indication, and a Store operation is ignored (i.e., the Load and Store operations are treated as if they received a Master-Abort error, as defined by the PCI Local Bus Specification), until the software explicitly releases the terminal bridge 200 so that the device driver can continue Load/Store operations to the IOA.

Also, from the time that the IOA EEH stopped state is entered, the IOA is prevented from completing a DMA operation, until the software explicitly releases terminal bridge 200 so that the IOA can continue DMA operations. For example, when the IOA requests access to the bus by activating the PCI REQ signal on the bus, do not signal the IOA that the operation may proceed by activating the PCI GNT signal on the bus or, alternatively, activate the PCI GNT signal, but then signal a Target-Abort of the operation, as defined by the PCI Local Bus Specification (i.e., target creates a certain signal combinations on the bus, as defined by the PCI Local Bus Specification, which signals that the target is aborting the operation).

When the IOA is the master of the operation (i.e., when the IOA is the initiator of the operation), as defined by the PCI Local Bus Specification, the terminal bridge 200 for that IOA does not place the IOA into the EEH stopped state on any of the errors listed in Table 1 and discards any write data if the operation is a write operation.

TABLE 1

| | |
|---|---|
| (1) | IOA Master-Aborts |
| (2) | IOA write operation with bad data parity |
| (3) | IOA Target-Aborted by the terminal bridge |
| (4) | IOA detects bad data parity on a read operation from the terminal bridge |

An IOA Master-Aborts error occurs when the terminal bridge detects bad address parity and does not respond. Therefore, the IOA Master-Aborts the operation. When an IOA write operation with bad data parity error occurs, the terminal bridge activates the PCI bus Parity Error (PERR) signal to the IOA and discards the write operation. When an IOA detects bad data parity on a read operation from the terminal bridge, the IOA activates the PCI bus PERR signal to the terminal bridge.

If the IOA is master and the EEH function is enabled for that IOA, then the terminal bridge places the IOA into the EEH stopped state on occurrence of any of the conditions listed in Table 2 and discards any write data if the operation is a write operation.

TABLE 2

| | |
|---|---|
| (1) | the IOA activates the PCI bus SERR signal |
| (2) | the IOA's posted write fails |

A posted write means that the IOA is no longer on the bus. An IOA's posted write to the terminal bridge may fail to the PCI Host Bridge (PHB) for transfers to the system. For peer-to-peer operations, the posted write may fail to another terminal PCI bus. The posted write may fail if the target, which is the PHB or another IOA beneath the same terminal bridge, does not respond. Also in peer-to-peer operations, the posted write may fail if the target signals a Target-Abort, or if the target detects a data parity error and signals a PERR. If an IOA posted write to the terminal bridge fails and the terminal bridge cannot determine the originating IOA master, then the terminal bridge either places all the terminal bridges for all the IOAs that might have been the originating IOA master, into the EEH stopped state, or the terminal bridge drives a non-recoverable error (for a PCI bus, that would be a SERR) to the PHB.

When the PHB is master for a Load or Store operation, the terminal bridge does not place the target IOA into the EEH stopped state on any of the conditions listed in Table 3 occurs and discards any write data in the buffers 206–208 if the operation is a write operation.

TABLE 3

| | |
|---|---|
| (1) | the PHB Master-Aborts |
| (2) | the PHB attempts a read/write operation with bad address parity |
| (3) | the PHB is Target-Aborted by the terminal bridge |
| (4) | the PHB detects bad data parity on a read operation from the terminal bridge |

In the case where the PHB attempts a read/write (i.e., Load/Store) operation with bad address parity, the terminal bridge does not respond, so the PHB Master-Aborts.

If the PHB is the master (i.e., for a Load or Store operation) and the terminal bridge for the target IOA has the EEH function enabled, then the terminal bridge for the target IOA places the IOA into the EEH stopped state and discards any write data if the operation is a write operation or returns all 1's in the data, on any of the occurrence of any of the conditions listed in Table 4.

TABLE 4

| | |
|---|---|
| (1) | the PHB delayed read fails on the terminal PCI bus, |
| (2) | the PHB delayed write (i.e., Store to PCI I/O space) fails on the target PCI bus and the terminal bridge returns no error to the PHB, |
| (3) | the PHB posted write operation (Store to PCI memory space) to the terminal bridge fails on the terminal PCI bus |
| (4) | the PHB write (Store) data has bad parity and the terminal bridge drives PERR to the PHB and discards the write data. |

The PHB posted write operation to the terminal bridge fails on the terminal PCI bus occurs when the IOA does not respond, and therefore, the terminal bridge Master-Aborts, or the IOA signals a Target-Abort or PERR.

If the terminal bridge for the IOA sees a SERR signaled, the terminal bridge places the IOA(s) on that terminal bus into the EEH stopped state. Finally, the IOAs does not share an interrupt with another IOA in the platform.

Store operations from the software are many times used to setup I/O operations in an IOA. The EEH stopped state prevents any corruption of data in the system by preventing the software from starting a particular I/O operation when a previous Store to the IOA fails. For example, the software issues Store operations to the IOA to tell the IOA what address and what data length to transfer and then tells the IOA via a different Store to initiate the operation. If one of the Stores prior to this initiation Store has failed, then the IOA may transfer the data to or from the wrong address or using the wrong length, and the data in the system will be corrupted. By putting the IOA into the EEH state, the Store operation which is used to initiate the I/O operation in the IOA will never reach the IOA, thus preventing transfer to or from the wrong address or with an invalid length.

In another methodology, I/O operations are sometimes initiated through memory queues in local memory 109. The software sets up an operation in a queue in local memory 109 and then tells the IOA to begin the operation. The IOA then reads the operation from local memory and updates the queue information in local memory by writing data to the local memory queue structure, including a status of the operation that it has performed (e.g., operation complete without error or operation completed with error). By placing the IOA into the EEH stopped state and preventing further operations by the IOA after an error from which the IOA cannot recover (e.g., a failure of a posted write operation to local memory), the IOA is prevented from signaling good completion of the operation in the local memory queue when in reality the data sent to local memory during the operation was in error.

While an IOA is in the EEH stopped state, a Load operation issued from the software to the IOA will return a data value of all-1's in the data bits. If the software looks at the returned data and determines that it is all-1's when it should not be (e.g., status bits in a status register that the software is expecting to be a value of 0) then it can determine that the terminal bridge may be in the EEH stopped state and can then look at the terminal bridge status registers to see if it is indeed in the EEH stopped state. If the terminal bridge is in the EEH stopped state, then the software can initiate the appropriate recovery procedures to reset the adapter, remove the terminal bridge from the EEH stopped state, and restart the operation.

With reference now to FIG. 3, a flowchart illustrating an exemplary method of isolating I/O bus errors to a single partition within a logically partitioned environment is depicted in accordance with the present invention. The processes illustrated in FIG. 3 may be implemented within a terminal bridge, such as, for example, terminal bridge 200 in FIG. 2.

To begin, the terminal bridge receives an indication of an error from the I/O adapter or from the PCI Host Bridge to which the terminal bridge is connected (step 302). The terminal bridge then determines whether the error is of a type that cannot be reported directly to the I/O adapter for handling (step 304). If the error is of a type that can be reported directly to the I/O adapter for handling, then the terminal bridge allows Load and Store operations to proceed without interruption (step 318).

If the error is of a type that cannot be reported directly to the I/O adapter for handling, then the terminal bridge places the I/O adapter into a stopped state, thereby preventing the I/O adapter from responding to Load & Store operations (step 306). The terminal bridge next determines if the operation occurring during the receipt of the error indication was a write operation (step 308). If the operation was a write operation, then the write data is discarded from the buffers within the terminal bridge (step 310). If the operation was not a write operation or after discarding the data in the buffers if the operation was a write operation, the terminal bridge maintains the I/O adapter in the stopped state waiting on a release from the software (step 312).

The terminal bridge than determines whether the software has released the terminal bridge (step 314). If not, then the terminal bridge continues to wait (step 312). If the software has released the terminal bridge, then the terminal bridge re-enables Load and Store operations to the I/O adapter (step 316).

It should be noted that, as used herein, the terms "read operation" and "load operation" may be used interchangeably and the terms "write operation" and "store operation" may also be used interchangeably. Furthermore, the description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logically partitioned data process system in which I/O bus errors are isolated, comprising:

a system bus;

a processing unit coupled to the system bus;

a memory unit coupled to the system bus;

a host bridge coupled to the system bus;

a first and a second terminal bridge coupled to the host bridge through a first bus;

a first input/output adapter coupled to the first terminal bridge through a second bus, a second input/output adapter coupled to the second terminal bridge through a third bus;

each terminal bridge prevents errors from each of the input/output adapters from affecting other components within the data processing system;

wherein each of the first and second input/output adapters is assigned to one of a plurality of logical partitions within the data processing system; and wherein the first terminal bridge, responsive to receipt of a first error type from the first input/output adapter of a type which can be reported directly to the input/output adapter for handling, does not place the first input/output adapter into a stopped state and does not prevent the input/output adapter from responding to Load and Store operations or performing direct memory access operations.

2. The logically partitioned data processing system as recited in claim 1, wherein the first, second, and third buses are peripheral component interconnect buses.

3. The logically partitioned data processing system as recited in claim 1, wherein the first terminal bridge, responsive to receipt of said a first error type from the first input/output adapter, prevents propagation of such errors to the first bus.

4. The logically partitioned data processing system as recited in claim 1, wherein each of the terminal bridges prevent errors as a result of an input/output adapter operation which belongs to one logical partition from affecting other logical partitions.

5. The logically partitioned data processing system as recited in claim 1, wherein the terminal bridge, responsive to a determination that a current operation is a write operation, discards data associated with the write operation.

6. The logically partitioned data processing system as recited in claim 1, wherein the terminal bridge, responsive to a determination that the first error type is a failure of a posted write operation in which an originating input/output adapter master posted the write operation, but is no longer on the bus and responsive to an inability to determine the originating input/output adapter master, places all input/output adapters that may have been the originating input/output adapter master into the stopped state.

7. A method in a logically partitioned data processing system comprising the steps of:

providing a plurality of terminal bridges coupled to a different only one of a plurality of I/O adapters;

providing a system bus;

coupling a processing unit to the system bus;

coupling a host bridge to the system bus;

coupling a first and a second terminal bridge to the host bridge through a first bus;

coupling a first I/O adapter to the first terminal bridge through a second bus, and coupling a second I/O adapter to the second terminal bridge through a third bus;

preventing, by the first terminal bridge, errors from propagating from the first I/O adapter to the first bus; and preventing, by the second terminal bridge, errors from propagating from the second I/O adapter to the first bus;

assigning each of the first and second I/O adapters to one of a plurality of logical partitions within the data processing system;

wherein responsive to a receipt by the first terminal bridge of a first error type from the first input/output adapter of a type which can be reported directly to the input/output adapter for handling, does not place the first input/output adapter into a stopped state and does not prevent the input/output adapter from responding to Load and Store operations or performing direct memory access operations.

8. The method according to claim 7, further comprising the steps of:

coupling each one of a plurality of terminal bridges to a different only one of a plurality of I/O adapters; and preventing, by each one of said plurality of terminal bridges, errors from one of said plurality of I/O adapters that is coupled to said one of said plurality of terminal bridges from being made available to other ones of said plurality of I/O adapters.

9. The method according to claim 7, further comprising the steps of:

including an error control handling device in each one of said plurality of terminal bridges;

preventing, by said error control handling device, errors from one of said plurality of I/O adapters from being made available to other ones of said plurality of I/O adapters.

10. The method according to claim 7, further comprising the steps of:

preventing, by each of the terminal bridges, errors as a result of an input/output adapter operation which belongs to one logical partition from affecting other logical partitions.

* * * * *

UNITED STATES PATENT AND TRADEMARK OFFICE
CERTIFICATE OF CORRECTION

| | | |
|---|---|---|
| PATENT NO. | : 6,643,727 B1 | Page 1 of 1 |
| APPLICATION NO. | : 09/589664 | |
| DATED | : November 4, 2003 | |
| INVENTOR(S) | : Arndt et al. | |

It is certified that error appears in the above-identified patent and that said Letters Patent is hereby corrected as shown below:

On Title page, col. 2, (74)Attorney, Agent, or Firm: after "McBurney;" delete "Lisa L. Yociss" and insert --Lisa L. B. Yociss--.

Col. 8, line 49: after "bus;" delete "and".

Signed and Sealed this

Eighteenth Day of July, 2006

JON W. DUDAS
*Director of the United States Patent and Trademark Office*